United States Patent
Arisoy et al.

(10) Patent No.: US 10,534,875 B2
(45) Date of Patent: Jan. 14, 2020

(54) OPTIMIZED PARTITIONING OF SOLID 3D MODELS FOR ADDITIVE MANUFACTURING

(71) Applicant: Siemens Product Lifecycle Management Software, Inc, Plano, TX (US)

(72) Inventors: Erhan Arisoy, Princeton, NJ (US); Suraj Ravi Musuvathy, Princeton, NJ (US); Lucia Mirabella, Plainsboro, NJ (US); Sanjeev Srivastava, Princeton, NJ (US); Livio Dalloro, Plainsboro, NJ (US)

(73) Assignee: SIEMENS INDUSTRY SOFTWARE INC., Plano, TX (US)

( * ) Notice: Subject to any disclaimer, the term of this patent is extended or adjusted under 35 U.S.C. 154(b) by 383 days.

(21) Appl. No.: 15/539,917

(22) PCT Filed: Jan. 21, 2016

(86) PCT No.: PCT/US2016/014208
§ 371 (c)(1),
(2) Date: Jun. 26, 2017

(87) PCT Pub. No.: WO2016/118682
PCT Pub. Date: Jul. 28, 2016

(65) Prior Publication Data
US 2018/0268091 A1 Sep. 20, 2018

Related U.S. Application Data

(60) Provisional application No. 62/105,846, filed on Jan. 21, 2015.

(51) Int. Cl.
*G06F 17/50* (2006.01)
*B33Y 50/00* (2015.01)
(Continued)

(52) U.S. Cl.
CPC .......... *G06F 17/5009* (2013.01); *B33Y 50/00* (2014.12); *G06F 17/50* (2013.01); *G06T 17/005* (2013.01); *B33Y 10/00* (2014.12)

(58) Field of Classification Search
CPC ...... G06F 17/50; G06F 17/5009; G06F 17/16; B29C 4/40; B29C 67/0088
See application file for complete search history.

(56) References Cited

U.S. PATENT DOCUMENTS

| 2014/0031967 A1* | 1/2014 | Unger | B29C 67/0088 700/119 |
| 2014/0052415 A1* | 2/2014 | Baran | G06F 17/50 703/1 |

(Continued)

OTHER PUBLICATIONS

"Chopper: Partitioning Models into 3-D Printable Parts" Linjie Luo et al; 9 pages, Dec. 2012.

*Primary Examiner* — Kandasamy Thangavelu

(57) ABSTRACT

A method of partitioning a model to facilitate printing of the model on a 3D printer includes identifying partition sensitive locations on the model and creating a binary tree with a root note representative of the model. An iterative partitioning process is applied to divide the model into objects by selecting a node of the binary tree without any children nodes, identifying a portion of the model corresponding to the node, and determining candidate cutting planes on the portion of the model based on the partition sensitive locations. During the process, analytic hierarchical processing (AHP) is applied to select an optimal cutting plane from the candidate cutting planes based on partitioning criteria. The optimal cutting plane is used to segment the portion of the model into sub-portions, and two children nodes representative of these sub-portions are created on the node of the binary tree.

20 Claims, 7 Drawing Sheets

(51) Int. Cl.
*G06T 17/00* (2006.01)
*B33Y 10/00* (2015.01)

(56) References Cited

U.S. PATENT DOCUMENTS

| | | | | |
|---|---|---|---|---|
| 2014/0324204 | A1* | 10/2014 | Vidimce | B29C 67/0088 |
| | | | | 700/98 |
| 2015/0113379 | A1* | 4/2015 | Wakefield | G06F 17/5009 |
| | | | | 715/227 |
| 2015/0154320 | A1* | 6/2015 | Umetani | B29C 64/40 |
| | | | | 703/1 |
| 2015/0269290 | A1* | 9/2015 | Nelaturi | G06F 17/5009 |
| | | | | 703/6 |
| 2016/0202389 | A1* | 7/2016 | Malvesin | G06F 17/16 |
| | | | | 703/2 |

* cited by examiner

OPTIMIZED PARTITIONING OF SOLID 3D MODELS FOR ADDITIVE MANUFACTURING

CROSS-REFERENCE TO RELATED APPLICATIONS

This application claims the benefit of U.S. Provisional Application Ser. No. 62/105,846 filed Jan. 21, 2015, which is incorporated herein by reference in its entirety.

TECHNICAL FIELD

The present disclosure relates to the optimized partitioning of solid 3D models for additive manufacturing. The technology described herein is particularly well-suited for, but not limited to, manufacturing physically large products.

BACKGROUND

Recent advances and price drops in additive manufacturing technology have made 3D printers more affordable than ever before. Although their wide-scale adoption is expanding day by day, a key challenge in 3D printing technology is that the 3D model to be printed must fit into the printing volume of the device, which limits the use of additive manufacturing to smaller crowds than its potential.

Existing commercial tools focus on partitioning of large 3D models into smaller pieces with the user's assistance. However, this strategy is not only tedious but also challenging if there are several pieces and engineering constraints. Recent advances in the field of computer graphics aim to preserve visual and physical properties of the model via optimization of different objective functions. For example, some researchers have studied preservation of visual properties during partitioning and the deformation behavior of the underlying model under different load conditions to reach an optimum partitioning. However, partitioning of large 3D models into small pieces is casted as a covering problem in these studies. Even if there is a feasible covering solution, it is difficult to calculate objective functions on non-planar partitions.

To address the aforementioned challenges, some conventional partitioning tools follow a top-down search for a binary tree representing the assembly sequence in which two components are merged at every step. These tools use algorithms based on binary space partitioning trees where arbitrary partitions are given up to gain on efficiency. Although these tools offer an efficient way of managing the partitioned data, conventional binary space partitioning techniques only consider user-provided objective function such as structural integrity and ignore additive manufacturing challenges such as thermal deformations, structural deformations, and support generation. Accordingly, it is desired to extend conventional partitioning schemes to provide a more robust and extensive set of considerations regarding partitioning.

SUMMARY

Embodiments of the present invention address and overcome one or more of the above shortcomings and drawbacks, by providing methods, systems, and apparatuses related to the optimized partitioning of solid 3D models for additive manufacturing. The technology described herein is particularly well-suited for, but not limited to, manufacturing physically large products.

According to some embodiments, a method of partitioning a model to facilitate printing of the model on a three-dimensional printer includes identifying a plurality of partition sensitive locations on the model and creating a binary tree with a root note representative of the model. An iterative partitioning process is applied to divide the model into a plurality of partitioned objects until a partitioning goal is achieved. This iterative partitioning process comprises selecting a node of the binary tree without any children nodes, identifying a portion of the model corresponding to the node, and determining a plurality of candidate cutting planes on the portion of the model based on the plurality of partition sensitive locations. During the process, analytic hierarchical processing (ARP) is applied to select an optimal cutting plane from the plurality of candidate cutting planes based on a plurality of partitioning criteria. The optimal cutting plane is used to segment the portion of the model into a first sub-portion and a second sub-portion, and two children nodes are created on the node of the binary tree. These two children nodes are representative of the first sub-portion and the second sub-portion.

Additional features, enhancements, or other modifications may be made to the aforementioned method in different embodiments. For example, in some embodiments, the three-dimensional printers are used to print physical objects corresponding to portions of the model associated with leaf nodes of the binary tree. In these embodiments, the partitioning goal may be designated based on the characteristics of the printers (e.g., available output volume). In some embodiments, the candidate cutting planes are determined by uniformly sampling a unit sphere in a plurality of directions to yield a plurality of normal vectors. The candidate cutting planes may then be generated using the plurality of normal vectors. For example, in one embodiment, the candidate cutting planes are generated using a subset of the normal vectors included within a bounding box of predetermined dimensions.

Various techniques may be applied in performing partitioning in the aforementioned method. For example, in some embodiments, the partition sensitive locations on the model are identified by calculating von Mises stress values for the model and identifying a plurality of stress locations on the model corresponding to von Mises stress values above a pre-determined value. These partition sensitive locations comprise the stress locations used in the method. In one embodiment, the partition sensitive locations further comprise locations identified by a user via a graphical user interface. In some embodiments, the partitioning criteria comprise a measurement of structural integrity above a minimal structural integrity value. The measurement of structural integrity for a particular candidate cutting plane may correspond to an expected structural deformation of each sub-portion of the model produced by applying the particular candidate cutting plane to the portion of the model. The partitioning criteria may further comprise a measurement of expected thermal deformation below a maximum thermal deformation value. Similar to the measurement of structural integrity, the measurement of expected thermal deformation for a particular candidate cutting plane may correspond to an expected thermal deformation of each sub-portion of the model produced by applying the particular candidate cutting plane to the portion of the model.

According to other embodiments, an article of manufacture for partitioning a model to facilitate printing of the model on a three-dimensional printer comprises a non-transitory, tangible computer-readable medium holding computer-executable instructions for performing the aforementioned method, with or without the additional features set out above.

According to other embodiments, a system partitioning a model to facilitate printing of the model on a three-dimensional printer includes a model receiver, an AHP component, a binary partitioning component, and one or more 3D printers. The model receiver component is configured to receive the model from an external source. The AHP component is configured to apply AHP in selection of an optimal plane for partitioning the model from a plurality of candidate planes. The binary partitioning component is configured to partition the model into a plurality of portions using the AHP component and the 3D printers are configured to print representations of the plurality of portions. In some embodiments, the system further includes a parallel processing platform comprising a plurality of processors configured to apply AHP to the plurality of candidate planes in parallel.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate generally to optimized partitioning of solid 3D models for additive manufacturing. Briefly, 3D solid models are recursively divided into smaller pieces that satisfy one or more printing constraints, such as printing volume size, structural integrity and thermal warping and printed surface quality. The technology disclosed herein may be applied in any various manufacturing scenarios, but the technology is especially relevant to scenarios involving the printing of large, complex objects. For example, where multiple 3D printers are available, the disclosed techniques may be used in parallel manufacturing scenarios to partition an input model and manufacture the corresponding product in parallel, thereby speeding up the overall manufacturing process. The partitioning strategies detailed in the present disclosure can also be used to selectively manufacture items using a combination of 3D printing and conventional manufacturing techniques. For example, in some embodiments, the overall cost of manufacturing is optimized by using economic factors (e.g., material costs, power consumption, etc.) to identify pieces that can be manufactured using conventional techniques that are less expensive than 3D printing.

Figure 1:
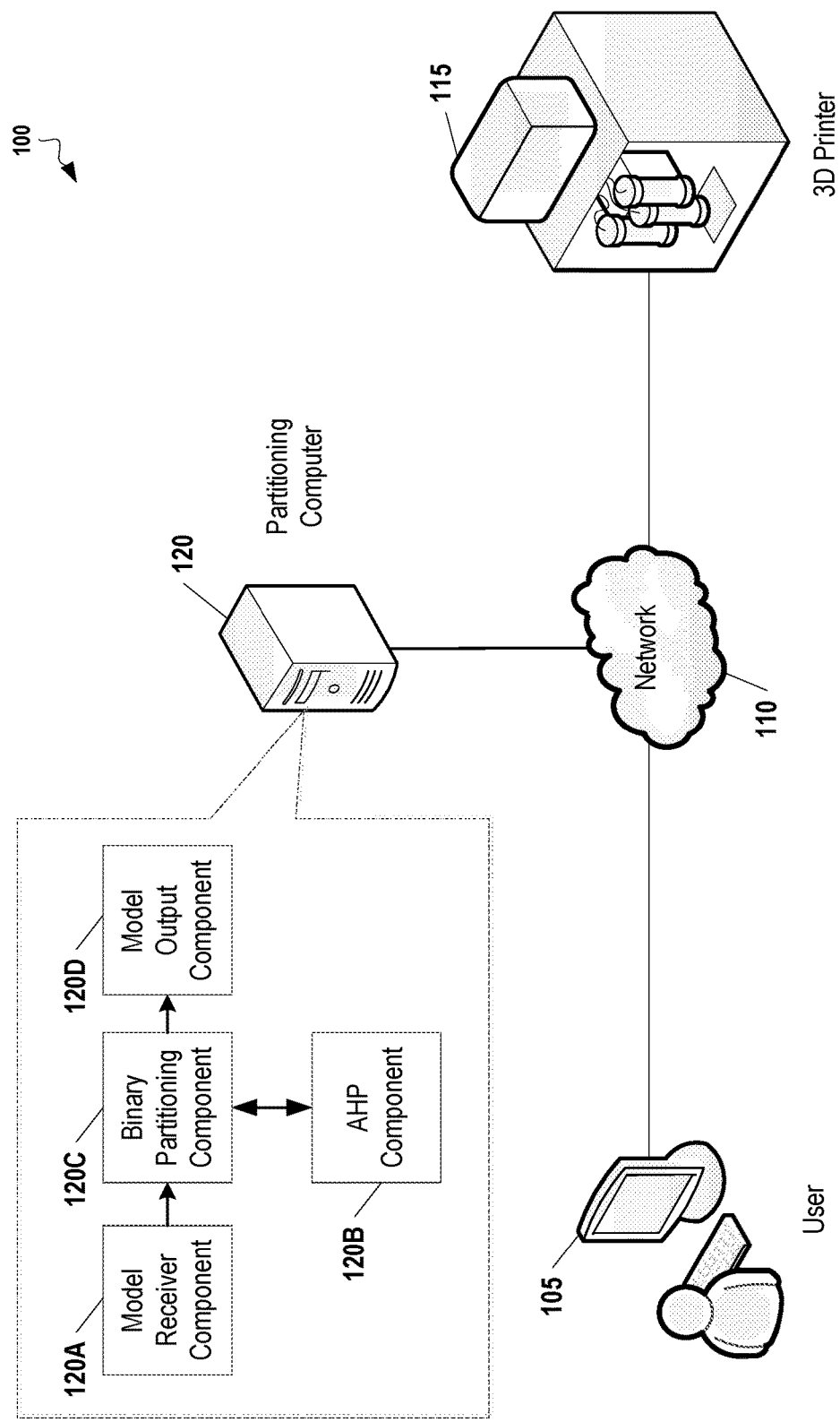
FIG. 1 illustrates a system for partitioning 3D models to support additive manufacturing applications, according to some embodiments of the present invention FIG. 2 provides an conceptual view of how AHP may be applied for partition selection, according to some embodiments.

FIG. 1 illustrates a system 100 for partitioning 3D models to support additive manufacturing applications, according to some embodiments of the present invention. A User Computer 105 is used to generate an initial 3D model of the object of interest. Any technique known in the art may be used for generating the 3D model. For example, in some embodiments, computer-aided design software is used to directly create the 3D models at the User Computer 105. In other embodiments, the 3D model may be based on one or more previously acquired images. For example, in medical printing applications, 3D data may be acquired using an imaging device such as, without limitation, a Magnetic Resonance Imaging (MRI) scanner, a Computed Tomography (CT) scanner, a Positron Emission Tomography (PET) scanner, or an ultrasound device. The acquired data may then be processed at the User Computer 105 to produce a 3D model of the anatomy of interest. Additionally, in some embodiments, imaging data may be acquired using multiple techniques and aggregated to provide a combined view of the object of interest.

A Partitioning Computer 120 receives the image data from the User Computer 105 via a computer network 110. This computer network 110 may be configured using a variety of hardware platforms. For example, the computer network 110 may be implemented using the IEEE 802.3 (Ethernet) or IEEE 802.11 (wireless) networking technologies, either separately or in combination. In addition, the computer network 110 may be implemented with a variety of communication tools including, for example, TCP/IP suite of protocols. In some embodiments, the computer network 110 is the Internet. A virtual private network (VPN) may be used to extend a private network across the computer network 110.

The Partitioning Computer 120 includes a Model Receiver Component 120A which is configured to receive the 3D model from the User Computer 105 and performing any pre-processing that may be required prior to partitioning. For example, in some embodiments, the Model Receiver Component 120A may include translation functionality that allows it to receive the 3D model in a variety of different formats and translate the received data into a common format for future processing. In this way, as new data formats are introduced, modifications to the Partitioning Computer may be localized at the Model Receiver Component 120A. Additionally, during pre-processing, the Model Receiver Component 120A identifies one or more locations on the 3D model that should be considered when determining where to create a cut (i.e., partition point) on the 3D model. These locations may be identified, for example, by using a stress model to identify locations on the 3D model that may affect the structural integrity of the printed object if they coincide with a cut location. Additionally, the Model Receiver Component 120A may receive additional information from the User Computer 105 that allows locations to be identified based on aesthetics or other concerns with the end product. In some embodiments, the Model Receiver Component 120A is configured to present a graphical user interface (GUI) on the User Computer 105 which allows the user to interactively select points on the 3D model for consideration during partitioning.

Following pre-processing performed by the Model Receiver Component 120A, the 3D model is partitioned into a binary tree using a Binary Partitioning Component 120C. The partitioning process is described in further detail below with respect to FIG. 2. Briefly, the Binary Partitioning Component 120C creates a binary tree where every tree node represents a planar (or non-planar) cutting plane and the children of every node are the two parts generated after the planar (or non-planar) cut. The Binary Partitioning Component 120C uses an Analytic Hierarchy Process (AHP) Component 120B to make decisions on how to partition each element of the binary tree in order to select the optimal cut. AHP is a technique generally known in the art for organizing and analyzing complex decisions. Traditionally, AHP is applied in business contexts where teams of people are working on problems involving human perceptions and judgments. The techniques described herein adopt these general principles to model the problem of selecting the optimal cut as a hierarchy containing the decision goal, the alternatives for reaching it, and the criteria for evaluating the alternatives.

The AHP Component 120B selects elements of the hierarchy for selecting an optimal partition based on one or more criteria related to partitioning of the object of interest. Examples of these elements include, without limitation, structural integrity, expected thermal and structural deformation while 3D printing; required support material volume, printed surface quality; placement of internal connecting points on each cross-section (i.e., connecting different cross-sections); placement of external connection points on each cross-section (i.e., connecting to external devices); a user provided region of interest; economic factors (e.g., cost of materials, power consumption required for printing); etc. Further detail on the use of AHP is provided below with respect to FIG. 2.

The output of the Binary Partitioning Component 120C is a binary tree where every node is a printable portion of the 3D model. A Model Output Component 120D in the Partitioning Computer 120 uses the binary tree to send instructions to a 3D Printer 115. In some embodiments, the Partitioning Computer 120 is configured to stream the instructions for each node, buffering the other nodes until the 3D Printer 115 is available for printing. Thus, in these embodiments, no changes are required to the 3D Printer 115. In other embodiments, the 3D Printer 115 may be configured to interpret the binary tree. Thus, the Model Output Component 120D can just send a representation of the binary tree to the 3D Printer 115 using any data format generally known in the art (e.g., Extensible Markup Language). It should be noted that the general output concept can be extended if additional three-dimensional printers are available. For example, the Model Output Component 120D may divide various portions of the binary tree between different three-dimensional printers. In some embodiments, the Model Output Component 120D may divide printing requests based on the functionality or materials available at different printers. Thus, the overall time required for manufacturing a product can be minimized by intelligently dividing printing requests between the available three-dimensional printers.

The 3D Printer 115 used to print the portions of the 3D model may be any three-dimensional printer generally known in the art. Additionally, in some embodiments, hybrid devices such as the big area additive manufacturing machines (BAMM) may be used which combine 3D printing with computer numerical control (CNC) routing. Moreover, the general techniques presented in FIG. 1 may be extended to specialized printers. For example, in some embodiments, the object of interest is a replacement organ and the 3D Printer 115 is a bio-printer. As is understood in the art, a bio-printer uses additive manufacturing techniques to deposit living cell material in layers whose thickness depends on the tissue being printed. Once the 3D Printer 115 has completed printing the organ, the tissues are stored in an incubator referred to as a "bio-reactor." While in the bio-reactor, the tissues mature in preparation of use in the patient's body. It should be noted that, in some embodiments, a specialized bio-printer may be used to print directly in the patient's body. In this case, the printed tissue can mature directly in the patient's body and incubation in the bio-reactor can be omitted.

It should be noted that the general strategy discussed above with reference to FIG. 1 may be applied to both planar and non-planar partitioning surfaces. For example, in some embodiments, partitions may be selected to perform a cut that automatically generates a joint to connect two pieces. In this way, it may be possible to connect two pieces without the use of adhesives or other connecting elements (e.g., nails).

Figure 2:
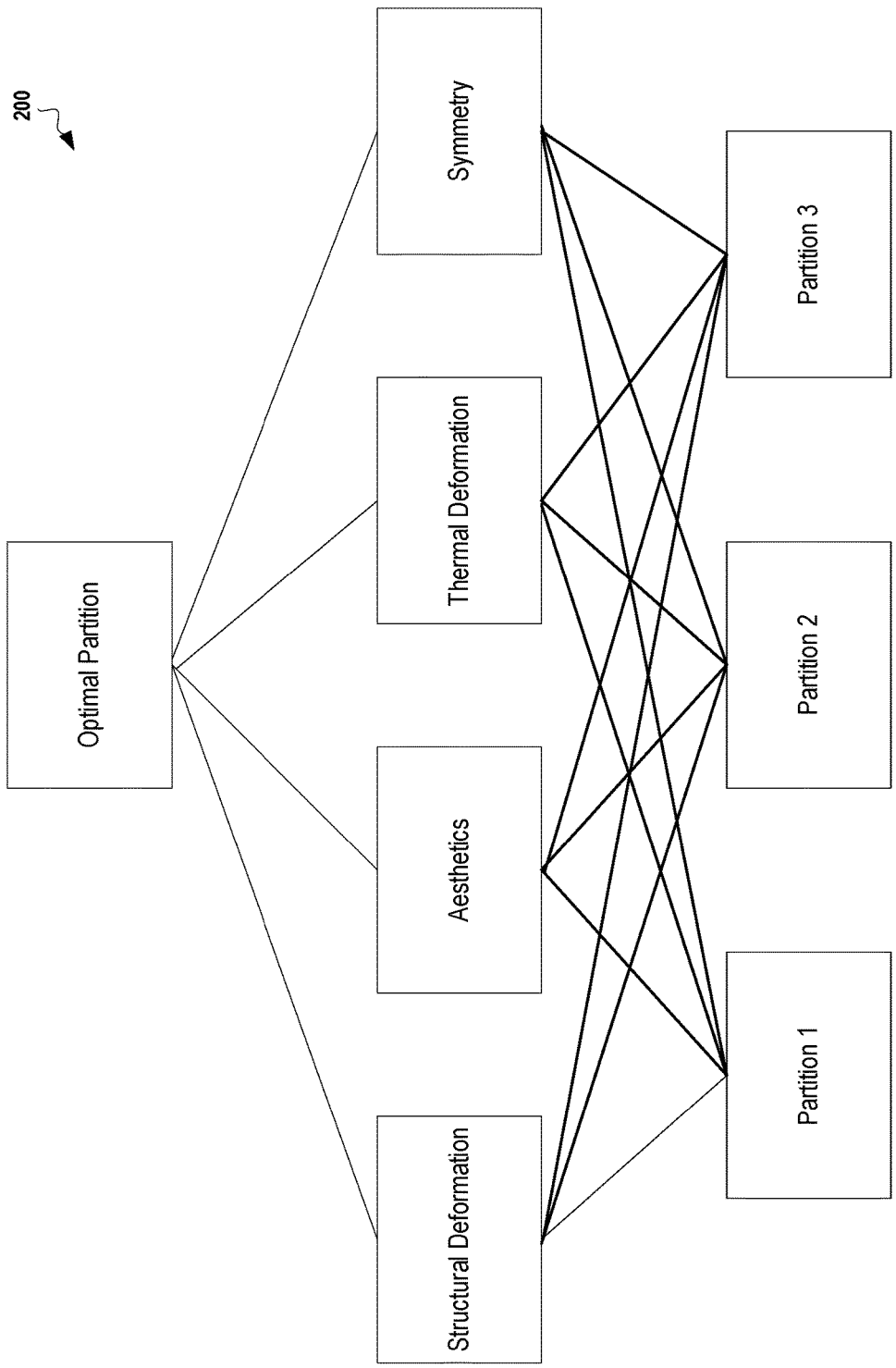

FIG. 2 provides an example hierarchy 200 which illustrates, conceptually, how AHP may be applied to select a partition. This example can be viewed as comprising three levels. At the first level, the goal is set forth: determining the optimal partition. The second level includes four partition criteria to consider when selecting the optimal partition: thermal deformation, aesthetics, structural deformation, and symmetry of resulting partitions. Finally, the third level includes three candidate partitions that are under consideration for the optimal partition.

Continuing with reference to FIG. 2, the initial step in AHP analysis is to store preference information for each of the four partitioning criteria in a matrix. Preference information is established for these elements by a series of pairwise comparisons between the elements. This may be based, for example, on user-specified preference values or based on predetermined values created for the object being partitioned. For example, for an airplane wing, structural integrity may be given a priority that far exceeds all other elements, while for a smartphone case, elements such as aesthetics may be as important (if not more important) than structural integrity. Ratio scales may then be derived from the principle eigenvectors of the matrix. Additionally, a consistency index may be derived from the principle eigenvector to identify any inconsistency in the preference information. If an inconsistency is identified, the user may be alerted to review and adjust preferences accordingly. This may be especially important, for example, where a large number of elements is used or where difference in prioritization between elements is minimal. For example, for a smartphone case, AHP may result in an aesthetically pleasing, but structurally unsound case. In this case, the user may want to adjust the preference values to ensure that structural integrity is given more weight.

For each partitioning criteria, a paired comparison matrix is formed. So, with reference to FIG. 2, because there are four preferences and three options, four 3×3 partition comparison matrices will be formed. The elements of each matrix are calculated based on an objective function associated with the corresponding partitioning criteria. For example, for structural deformation, an objective function is used to generate a structural deformation measurement for each of the candidate partitions. Using this measurement, each candidate partition may be compared pairwise in order to populate the corresponding 3×3 matrix. Once all four partition comparison matrices have been populated, a normalized eigenvector is calculated for each matrix to produce a priority vector which effectively ranks the partitions for the corresponding partition criteria. The elements of the priority vector are percentage values. For example, for structural deformation, one partition may correspond to a value of 75%, while the other partitions each correspond to a value of 12.5%. The ratio scales discussed above are applied to these priority vectors to yield a composite weighting for each candidate partition. Then, using this composite weighting, the most preferable candidate partition is selected as the optimal partition.

In some embodiments, the computations associated with AHP may be parallelized using a parallel computing platform (e.g., a GPU system implementing NVIDIA's CUDA architecture). This may be especially valuable when considering a very large number of partition criteria and/or candidate partitions. For example, a processing resource may be assigned to each candidate partition. The processing resource can determine the priority vector for a particular candidate partition. Then, the information from the various processing resources can be synthesized (e.g. by one of the processing resources) to determine the composite score and, thus, the optimal partition. Any parallel processing tools generally known in the art (e.g., Map/Reduce) may be used to facilitate the parallelization process.

Figure 3:
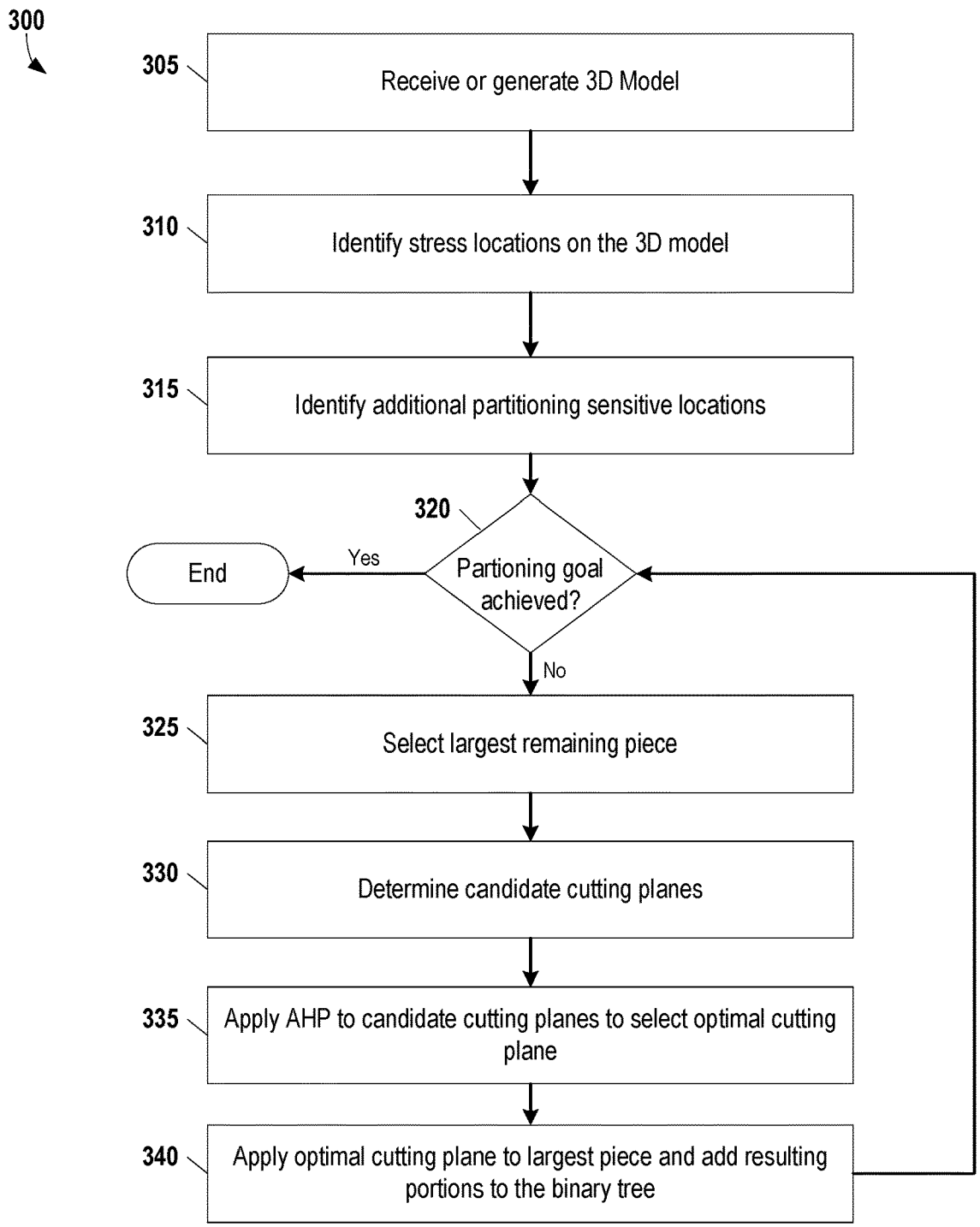
FIG. 3 provides an overview of process for partitioning 3D models, according to some embodiments.

FIG. 3 provides an overview of process 300 for partitioning 3D models, according to some embodiments. Starting at step 305, a 3D model is received or generated by a computer. Next, at step 310, stress points of the 3D model are identified. Any technique generally known in the art may be used to identify stress points. For example, in some embodiments, the stress points are identified via a Von Mises stress model. As is generally understood in the art, Von Mises stress is a measure of the energy required to distort a volume. The value of Von Mises stress is based on factors such as the structure and composition of the material itself. When compared to a simple tension case, Von Mises stress can provide an indication of when a particular material will fail. Thus, in the context of FIG. 3, each Von Mises stress point offers an indication of a potential point of failure that should be factored into the partitioning analysis performed in the remaining steps of FIG. 3, as described below.

Next, at step 315, additional partitioning sensitive locations on the surface of the 3D model may also be identified. These additional partitioning sensitive locations may be selected, for example, by the user or algorithmically based on user preferences or other criteria. In some embodiments, the locations are selected at step 315 based on cosmetic features of the end product that the 3D model represents. Note that any partitioning requires later assembly of the constituent pieces, for example, by gluing the pieces together. Although efforts may be made to minimize visual detection of the joint (or seam) between two joined parts, it may be difficult (if not impossible) to produce an end product without visually detectably joints. Thus, at step 315, locations on the product may be selected that would minimize visual detection of the seam in the end product. For example, for a toy animal, the user may exclude regions on the face (e.g., between the eyes).

The general concept of excluding partitioning sensitive points may also be applied to scenarios where interlocking mechanisms are used to connect multiple components together. For example, one piece may include a feature that allows it to interlock with a feature included on a second piece. In this case, the region around the interlocking feature of each piece may be designated as partitioning sensitive. This concept may also be extended to more complicated interlocking scenarios. For example, where two tenon pieces interlock within a mortise of a third piece, the region around the mortise can be designated as partitioning sensitive, with the assumption that this region will be subject to stress as the manufactured product is used for its intended purpose.

Continuing with reference to FIG. 3, at steps 320-335 an iterative process is used to perform partitioning on the 3D model into a binary tree. Initially at step 320, a check is made to see if the partitioning goal has been achieved. The partitioning goal is one or more quantifiable aspects of the 3D models that are evaluated to determine when partitioning is complete. For example, in some embodiments, the size of each component of the 3D model is evaluated at step 320 to determine if it is less than a predetermined value (e.g., the available output volume of the 3D printer(s) that will be printing the 3D Model). In other embodiments, the projected weight of each component of the 3D model is considered. For example, for a large scale industrial item, a requirement may be set that each printed component of the 3D model must weigh less that a particular weight capacity associated with vehicle(s) that will transport the components of the 3D model. If the partitioning goal is met, then the process 300 terminates. Otherwise, the largest remaining piece of the 3D model is selected at step 325 and the process continues.

At step 330, the possible cutting planes of the largest remaining pieces are determined. The largest remaining piece then becomes the "parent node" of the binary tree upon which this partition process will create two children representing the result of cutting the largest remaining piece along a particular plane. Initially, the normals of each cutting plane may be determined by uniformly sampling a large number of different directions on a unit sphere. Other techniques for determining the plane normal may alternatively be applied (e.g., using different shapes that are more suitable to the shape of the 3D model). The offsets for each plane are determined by sampling a minimum bounding box of the partition that is under consideration. The size of the sampling interval for the plane offsets may be based on a predetermined value or it may be supplied by the user. In some embodiments, the sampling interval is based on the level of detail present in the 3D model. For example, a small sampling interval may be used for models with fine detail, while a larger sampling may be used if the details are coarser. Additionally, other constraints may be applied at step 330 based on manufacturing design details. For example, the size of each cutting plane may be limited such that the partitions are printable within the physical hardware available in a particular production facility. Additionally considerations such as transportation limitations (e.g., delivery truck capacity) may also be considered in determining the size of each cut.

Once the possible cutting planes have been determined, AHP is applied at step 335 to select the optimal cut. As noted above with respect to FIG. 1, AHP will analyze the possible cutting planes and provide ranking of the available cutting planes which reflects the various qualities desired in the partitioning. It should be noted that step 330 may produce a large number of cutting planes. To reduce processing time, AHP processing of each processing plane may be distributed across a parallel processing platform. Additionally (or alternatively), a filtering operation may be performed on the possible cutting planes to eliminate cutting planes that fail to meet some minimum criteria for use. For example, some cutting planes may result in pieces that are overly thin. Without even analyzing the structural integrity of each piece, it may be assumed that the structural soundness of the end product would be limited if such pieces were used. Thus, a threshold may be applied to the group of candidate cutting planes that requires each plane to have a thickness over a pre-determined value.

Figure 4:
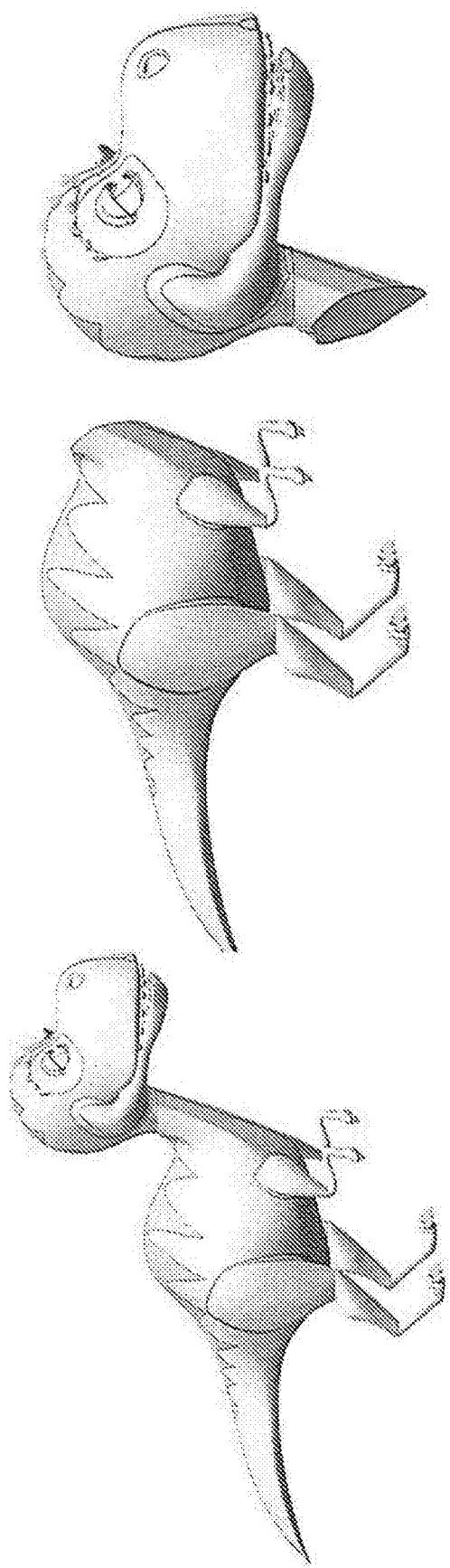
FIG. 4 provides a first example of model partitioning, according to some embodiments.
Figure 5:
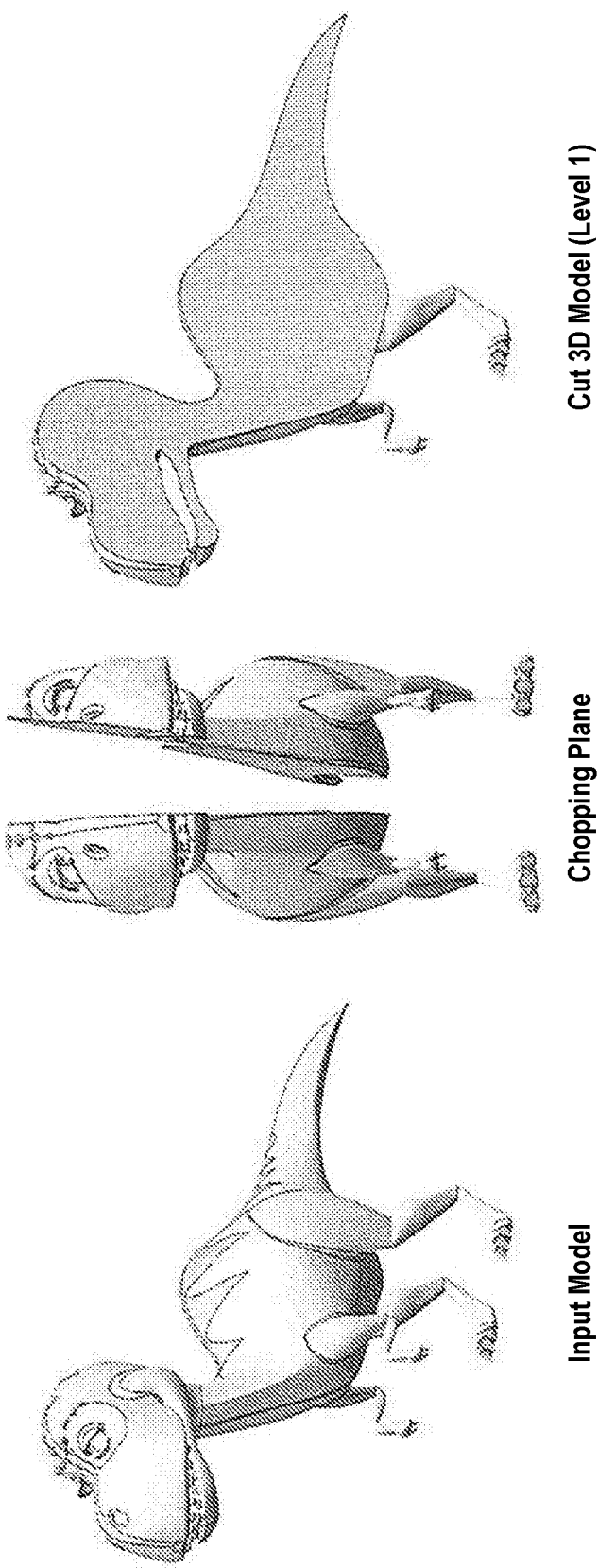
FIG. 5 provides a second example of model partitioning, according to some embodiments.

Finally, at step 340, the parent object is partitioned along the optimal cutting plane and the resulting two new pieces are entered into the binary tree as children nodes to the parent object. FIGS. 4 and 5 provide two examples of how an initial partition may be carried out. In FIG. 4, an input model of a toy dinosaur has been partitioned into one partition including the dinosaur's head and a second partition with the rest of the body. FIG. 5 illustrates how partitioning may be performed when symmetry is used as highest priority factor in the AHP analysis. Thus, the cutting planes are selected to be close to the points that are on the global symmetry axis of the input mode.

Following step 340, the process then continues recursively at step 320, where each newly created child object is subjected to the partitioning process. Once the partitioning goal has been achieved at step 320, the output is a fully formed binary tree where each leaf node of the tree provides a printable component that is optimized according the AHP priority elements.

Figure 6:
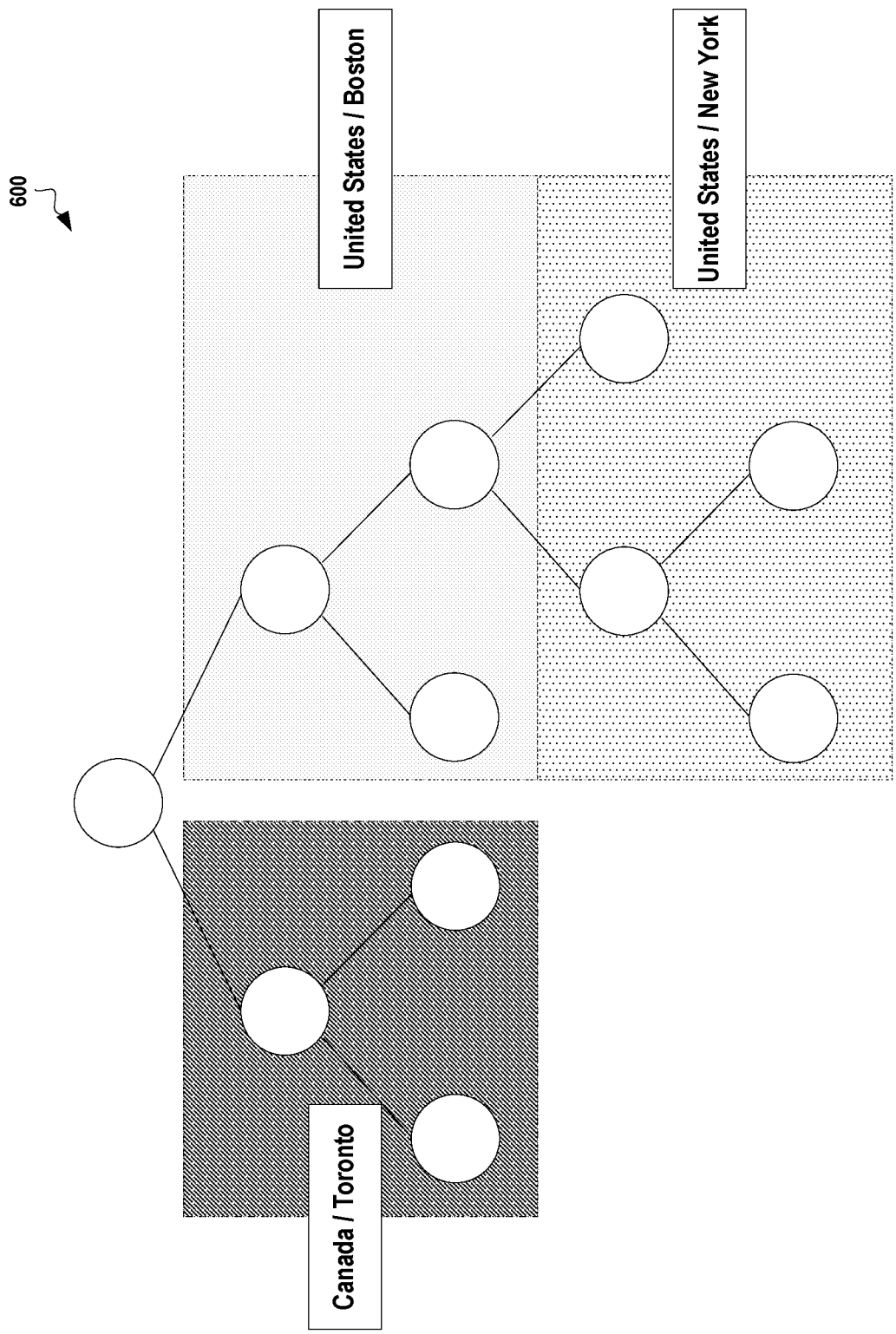
FIG. 6 provides a binary tree that is geographically partitioned based on availability of printer facilities in three different locations, according to some embodiments.

One of the benefits of the binary tree design is that it can scale up to complex additive manufacturing scenarios. For example, FIG. 6 provides a binary tree 600 that is geographically partitioned based on availability of printer facilities in three different locations: Toronto, Boston, and New York. This may be accomplished, for example, by adding an additional step to the process illustrated in FIG. 3, where selection of the largest remaining piece at step 325 can be performed with a geographic constraint. For example, rather than simply selecting the largest remaining piece, step 325 may be modified to select the largest remaining piece which can be produced at the Toronto facility. Then, during the next iteration it may select the largest piece producible at the Boston facility. Continuing in this way, production of large scale products can be distributed over any number of production facilities. As an alternative to changing step 325, geographic preferences may be added as an element to the AHP processing performed at step 335. For example, geography of product facility may be prioritized over characteristics such as aesthetics. Thus, a cutting plane may be selected that produces at least one object producible within the target geography. Another alternative way to capture geographic preferences is to modify binary tree generation itself. Thus, rather than having a single tree containing information on three different production facilities, three different binary trees may be used, with each tree representing one of the production facilities.

As noted above, in some embodiments, AHP is parallelized using a parallel computing platform. Parallelization may also be implemented on a higher level using the structure of the binary tree itself. More specifically, each node of the binary tree may be partitioned in parallel. Note that each partition creates two independent partitioned objects. Following the first division, the two resulting first level partitioned objects can be processed in parallel. Then, following division of the first level partitioned objects, the resulting four second level partitioned objects can be processed in parallel. This general process can be extended and scaled to the amount of processing resources available.

Some conventional 3D printing applications require support structures to maintain object integrity during printing. For example, consider the printing of a sphere. An internal structure is required to maintain the spheroid shape during printing; otherwise the upper portion may become deformed, or even collapse upon itself, due to the effects of gravity. However, this internal structure adds weight to the final product that is generally undesirable. Using the techniques described herein, the sphere can be intelligently divided into two or more pieces and then assembled after printing, thus eliminating the need for scaffolding. Moreover, this general concept can be extended to other applications where scaffolding would ordinarily be required (e.g., if the object includes steep overhangs or cantilevered sections). In some embodiments the stress model used during partitioning (see, e.g., step 310 in FIG. 3) may be adapted to emphasize portions of the object that may be subject to deformation during printing. In other embodiments, different mathematical models may be employed which analyze the object and automatically identify portions which would ordinary require support structures. These models may be incorporated into the AHP processing described with the partitioning techniques described herein. Using the hierarchical prioritization scheme available in AHP, cutting planes which minimize the need for support structures could be prioritized over other characteristics when selecting the optimal cutting plane.

In some embodiments, in addition to using AHP to determine each cutting plane, the user can guide the cutting process by directly sketching on the 3D model in a GUI. Once the user sketches a line, any technique known in the art may be used to estimate plane normals based on 3D curve living on the underlying model. For example, in some embodiments, the normal of the cutting plane is assumed to be the orthogonal vector to the viewing direction where the plane goes through the user drawn line.

Figure 7:
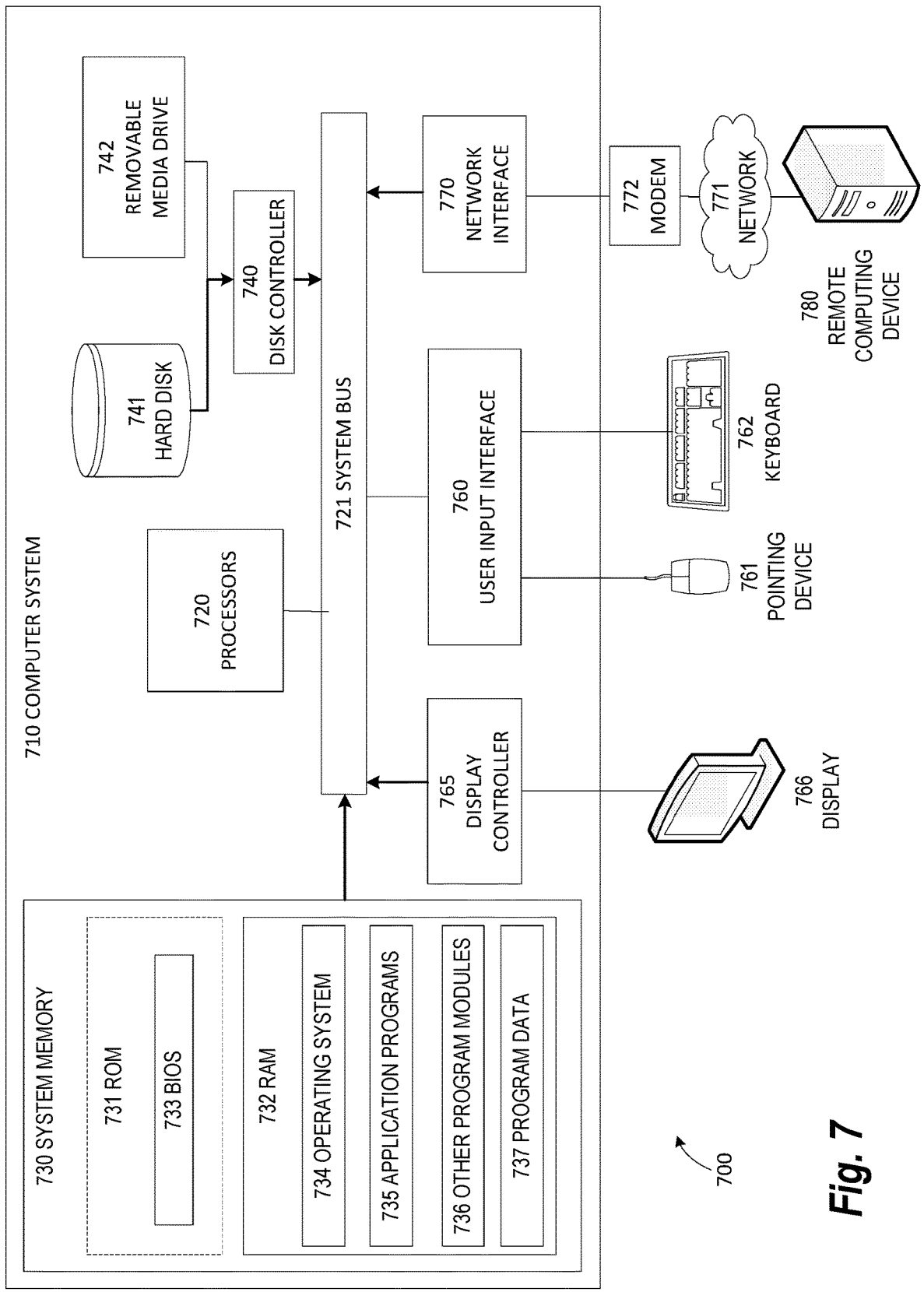
FIG. 7 illustrates an exemplary computing environment within which embodiments of the invention may be implemented

FIG. 7 illustrates an exemplary computing environment 700 within which embodiments of the invention may be implemented. In some embodiments, the computing environment 700 may be used to implement one or more of the components illustrated in the system 100 of FIG. 1. For example, this computing environment 700 may be configured to execute the process 300 described above with respect to FIG. 3. Computers and computing environments, such as computer system 710 and computing environment 700, are known to those of skill in the art and thus are described briefly here.

As shown in FIG. 7, the computer system 710 may include a communication mechanism such as a bus 721 or other communication mechanism for communicating information within the computer system 710. The computer system 710 further includes one or more processors 720 coupled with the bus 721 for processing the information. The processors 720 may include one or more central processing units (CPUs), graphical processing units (GPUs), or any other processor known in the art.

The computer system 710 also includes a system memory 730 coupled to the bus 721 for storing information and instructions to be executed by processors 720. The system memory 730 may include computer readable storage media in the form of volatile and/or nonvolatile memory, such as read only memory (ROM) 731 and/or random access memory (RAM) 732. The system memory RAM 732 may include other dynamic storage device(s) (e.g., dynamic RAM, static RAM, and synchronous DRAM). The system memory ROM 731 may include other static storage device(s) (e.g., programmable ROM, erasable PROM, and electrically erasable PROM). In addition, the system memory 730 may be used for storing temporary variables or other intermediate information during the execution of instructions by the processors 720. A basic input/output system (BIOS) 733 containing the basic routines that help to transfer information between elements within computer system 710, such as during start-up, may be stored in ROM 731. RAM 732 may contain data and/or program modules that are immediately accessible to and/or presently being operated on by the processors 720. System memory 730 may additionally include, for example, operating system 734, application programs 735, other program modules 736 and program data 737.

The computer system 710 also includes a disk controller 740 coupled to the bus 721 to control one or more storage devices for storing information and instructions, such as a hard disk 741 and a removable media drive 742 (e.g., floppy disk drive, compact disc drive, tape drive, and/or solid state drive). The storage devices may be added to the computer system 710 using an appropriate device interface (e.g., a small computer system interface (SCSI), integrated device electronics (IDE), Universal Serial Bus (USB), or FireWire).

The computer system 710 may also include a display controller 765 coupled to the bus 721 to control a display 766, such as a cathode ray tube (CRT) or liquid crystal display (LCD), for displaying information to a computer user. The computer system includes an input interface 760 and one or more input devices, such as a keyboard 762 and a pointing device 761, for interacting with a computer user and providing information to the processor 720. The pointing device 761, for example, may be a mouse, a trackball, or a pointing stick for communicating direction information and command selections to the processor 720 and for controlling cursor movement on the display 766. The display 766 may provide a touch screen interface which allows input to supplement or replace the communication of direction information and command selections by the pointing device 761.

The computer system 710 may perform a portion or all of the processing steps of embodiments of the invention in response to the processors 720 executing one or more sequences of one or more instructions contained in a memory, such as the system memory 730. Such instructions may be read into the system memory 730 from another computer readable medium, such as a hard disk 741 or a removable media drive 742. The hard disk 741 may contain one or more datastores and data files used by embodiments of the present invention. Datastore contents and data files may be encrypted to improve security. The processors 720 may also be employed in a multi-processing arrangement to execute the one or more sequences of instructions contained in system memory 730. In alternative embodiments, hard-wired circuitry may be used in place of or in combination with software instructions. Thus, embodiments are not limited to any specific combination of hardware circuitry and software.

As stated above, the computer system 710 may include at least one computer readable medium or memory for holding instructions programmed according to embodiments of the invention and for containing data structures, tables, records, or other data described herein. The term "computer readable medium" as used herein refers to any medium that participates in providing instructions to the processor 720 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 741 or removable media drive 742. Non-limiting examples of volatile media include dynamic memory, such as system memory 730. Non-limiting examples of transmission media include coaxial cables, copper wire, and fiber optics, including the wires that make up the bus 721. Transmission media may also take the form of acoustic or light waves, such as those generated during radio wave and infrared data communications.

The computing environment 700 may further include the computer system 710 operating in a networked environment using logical connections to one or more remote computers, such as remote computer 780. Remote computer 780 may be a personal computer (laptop or desktop), a mobile device, a server, a router, a network PC, a peer device or other common network node, and typically includes many or all of the elements described above relative to computer system 710. When used in a networking environment, computer system 710 may include modem 772 for establishing communications over a network 771, such as the Internet. Modem 772 may be connected to bus 721 via user network interface 770, or via another appropriate mechanism.

Network 771 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 710 and other computers (e.g., remote computer 780). The network 771 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 771.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

The invention claimed is:

1. A method of facilitate printing of a model on a three-dimensional printer, the method comprising:
   identifying a plurality of partition sensitive locations on the model;
   creating a binary tree with a root node representative of the model;
   applying an iterative partitioning process to divide the model into a plurality of partitioned objects until a partitioning goal is achieved, the iterative partitioning process comprising:
      selecting a node of the binary tree without any children nodes,
      identifying a portion of the model corresponding to the node,
      determining a plurality of candidate cutting planes on the portion of the model based on the plurality of partition sensitive locations,
      applying analytic hierarchical processing (AHP) to select an optimal cutting plane from the plurality of candidate cutting planes based on a plurality of partitioning criteria,
      using the optimal cutting plane to segment the portion of the model into a first sub-portion and a second sub-portion, and
      creating two children nodes on the node of the binary tree, the two children nodes representative of the first sub-portion and the second sub-portion; and
   sending instructions to the three-dimensional printer to print the model according to the binary tree, including to print the first and second sub-portions of the model represented by the two children nodes.

2. The method of claim 1, further comprising:
   using one or more three-dimensional printers to print physical objects corresponding to portions of the model associated with leaf nodes of the binary tree.

3. The method of claim 2, wherein the partitioning goal corresponds to an output volume corresponding to the one or more three-dimensional printers.

4. The method of claim 1, wherein the identifying the plurality of partition sensitive locations on the model comprise:
   calculating von Mises stress values for the model; and
   identifying a plurality of stress locations on the model corresponding to von Mises stress values above a pre-determined value,
   wherein the plurality of partition sensitive locations comprise the plurality of stress locations.

5. The method of claim 4, wherein the identifying the plurality of partition sensitive locations on the model further comprise:
   presenting a graphical user interface to a user;
   receiving an identification of one or more user-selected locations on the model via the graphical user interface,
   wherein the plurality of partition sensitive locations further comprises the one or more user-selected locations.

6. The method of claim 1, wherein the plurality of candidate cutting planes are determined by a process comprising:
   uniformly sampling a unit sphere in a plurality of directions to yield a plurality of normal vectors;
   generating the plurality of candidate cutting planes using the plurality of normal vectors.

7. The method of claim 6, wherein each of the plurality of candidate cutting planes is generated using a subset of the plurality of normal vectors included within a bounding box of predetermined dimensions.

8. The method of claim 1, wherein the plurality of partitioning criteria comprise a measurement of structural integrity above a minimal structural integrity value.

9. The method of claim 8, wherein the measurement of structural integrity for a particular candidate cutting plane corresponds to an expected structural deformation of each sub-portion of the model produced by applying the particular candidate cutting plane to the portion of the model.

10. The method of claim 8, wherein the plurality of partitioning criteria further comprise a measurement of expected thermal deformation below a maximum thermal deformation value.

11. The method of claim 10, wherein the measurement of expected thermal deformation for a particular candidate cutting plane corresponds to an expected thermal deformation of each sub-portion of the model produced by applying the particular candidate cutting plane to the portion of the model.

12. The method of claim 1, wherein applying AHP to select the optimal cutting plane from the plurality of candidate cutting planes comprises executing a plurality of processing steps for each of the plurality of candidate cutting planes in parallel using a parallel computing platform.

13. An article of manufacture to facilitate printing of a model on a three-dimensional printer, the article of manufacture comprising a non-transitory, tangible computer-readable medium holding computer-executable instructions for performing a method comprising:
   identifying a plurality of partition sensitive locations on the model;

creating a binary tree with a root node representative of the model;

applying an iterative partitioning process to divide the model into a plurality of partitioned objects until a partitioning goal is achieved, the iterative partitioning process comprising:

selecting a node of the binary tree without any children nodes, identifying a portion of the model corresponding to the node, determining a plurality of candidate cutting planes on the portion of the model based on the plurality of partition sensitive locations, applying analytic hierarchical processing (AHP) to select an optimal cutting plane from the plurality of candidate cutting planes based on a plurality of partitioning criteria, using the optimal cutting plane to segment the portion of the model into a first sub-portion and a second sub-portion, and creating two children nodes on the node of the binary tree, the two children nodes representative of the first sub-portion and the second sub-portion.

14. The article of manufacture claim 13, wherein the method further comprises:

using one or more three-dimensional printers to print physical objects corresponding to portions of the model associated with leaf nodes of the binary tree.

15. The article of manufacture claim 13, wherein the identifying the plurality of partition sensitive locations on the model comprise:

calculating von Mises stress values for the model; and identifying a plurality of stress locations on the model corresponding to von Mises stress values above a pre-determined value, wherein the plurality of partition sensitive locations comprise the plurality of stress locations.

16. The article of manufacture of claim 15, wherein the identifying the plurality of partition sensitive locations on the model further comprise:

presenting a graphical user interface to a user;

receiving an identification of one or more user-selected locations on the model via the graphical user interface, wherein the plurality of partition sensitive locations further comprises the one or more user-selected locations.

17. The article of manufacture of claim 13, wherein the plurality of candidate cutting planes are determined by a process comprising:

uniformly sampling a unit sphere in a plurality of directions to yield a plurality of normal vectors;

generating the plurality of candidate cutting planes using the plurality of normal vectors.

18. The article of manufacture of claim 17, wherein each of the plurality of candidate cutting planes is generated using a subset of the plurality of normal vectors included within a bounding box of predetermined dimensions.

19. A system to facilitate printing of a model on a three-dimensional printer, the system comprising:

a computing system comprising one or more processors and a memory storing instructions for:

a model receiver component configured to receive the model from an external source;

an analytic hierarchical processing (AHP) component configured to apply AHP in selection of an optimal plane for partitioning the model from a plurality of candidate planes; and a binary partitioning component configured to partition the model into a plurality of portions until a partitioning goal is achieved using the optimal plane selected by the AHP component for each partition; and one or more 3D printers configured to print representations of the plurality of portions.

20. The system of claim 19, further comprising:

a parallel processing platform comprising a plurality of processors configured to apply AHP to the plurality of candidate planes in parallel.

* * * * *